United States Patent
Heuer et al.

(10) Patent No.: US 8,683,320 B2
(45) Date of Patent: Mar. 25, 2014

(54) PROCESSING MODULE, A DEVICE, AND A METHOD FOR PROCESSING OF XML DATA

(75) Inventors: Jörg Heuer, Oberhaching (DE); Sebastian Käbisch, München (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 12/705,658

(22) Filed: Feb. 15, 2010

(65) Prior Publication Data

US 2010/0211867 A1 Aug. 19, 2010

(30) Foreign Application Priority Data

Feb. 13, 2009 (EP) .................................. 09002043

(51) Int. Cl.
*G06F 17/00* (2006.01)
(52) U.S. Cl.
USPC ............................ 715/234; 715/237; 715/242
(58) Field of Classification Search
USPC ........... 715/234–237, 239, 242, 254; 717/143
See application file for complete search history.

(56) References Cited

U.S. PATENT DOCUMENTS

| | | | | |
|---|---|---|---|---|
| 5,136,290 | A * | 8/1992 | Bond et al. | 341/67 |
| 7,818,165 | B2 * | 10/2010 | Carlgren et al. | 704/8 |
| 7,882,428 | B2 * | 2/2011 | Heuer et al. | 715/234 |
| 2002/0128813 | A1 * | 9/2002 | Engelsberg et al. | 704/1 |
| 2003/0154444 | A1 * | 8/2003 | Tozawa et al. | 715/513 |
| 2004/0013307 | A1 * | 1/2004 | Thienot et al. | 382/232 |
| 2004/0143791 | A1 * | 7/2004 | Ito et al. | 715/513 |
| 2005/0033795 | A1 * | 2/2005 | Wood | 709/200 |
| 2005/0182778 | A1 * | 8/2005 | Heuer et al. | 707/101 |
| 2005/0273440 | A1 * | 12/2005 | Ching | 705/64 |
| 2007/0113222 | A1 | 5/2007 | Dignum et al. | 717/143 |
| 2008/0104095 | A1 * | 5/2008 | Heifets et al. | 707/101 |
| 2008/0313234 | A1 * | 12/2008 | Chen et al. | 707/104.1 |

OTHER PUBLICATIONS

"Efficient XML Interchange (EXI) Format 1.0", http://www.w3.org/TR/2008/WD-exi-20080919/, copyright 2008.*
Niedermeier U et. al., "MPEG-7 Binary Format for XML Data" Data Compression Conference, Proceedings. DCC, IEEE Computer Society Press, Los Alamitos, CA, IS, Jan. 1, 2002, p. 467 (1 page).

* cited by examiner

*Primary Examiner* — Thu Huynh
(74) *Attorney, Agent, or Firm* — King & Spalding L.L.P.

(57) ABSTRACT

For processing of XML data by use of a finite state automaton, the XML data is based on a predetermined XML schema and the finite state automaton has states and transitions being arranged based on the predetermined XML schema. In the finite state automaton, at least one of the transitions of the finite state automaton, which refers to an element or attribute of the XML schema, has a variable length binary code, the variable length binary code being arranged to code the element or attribute of the XML schema. An improved handling of XML data in several systems or devices of several technical areas is provided, wherein saving of memory resources and processing resources or costs in the systems and devices is enabled.

14 Claims, 5 Drawing Sheets

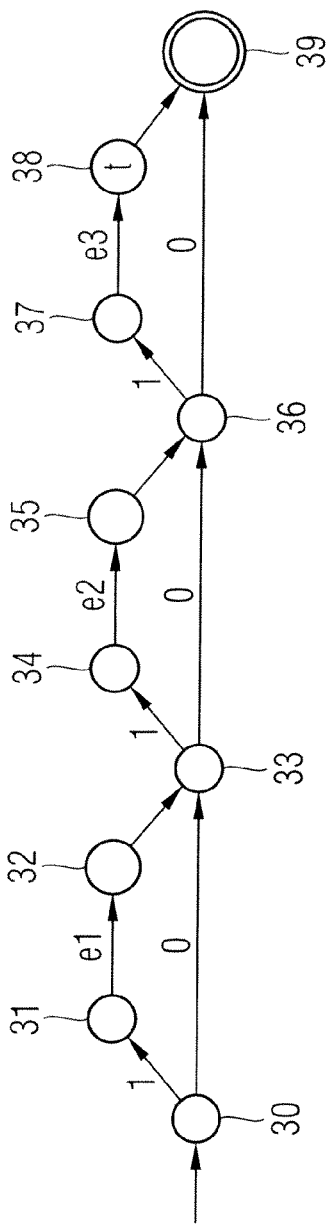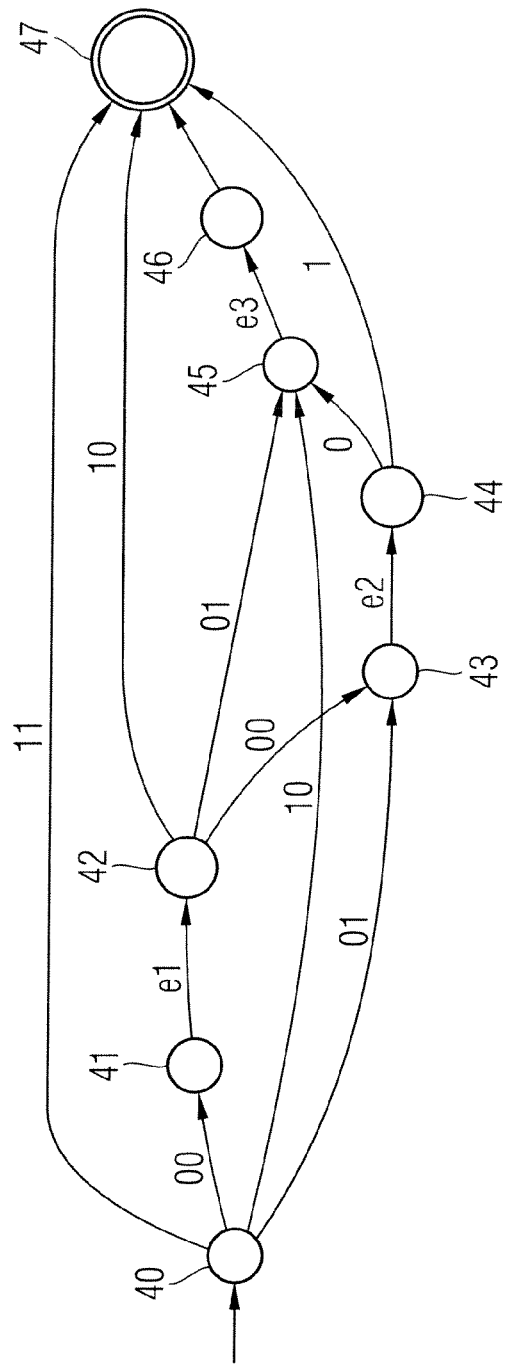
FIG 3
FIG 4

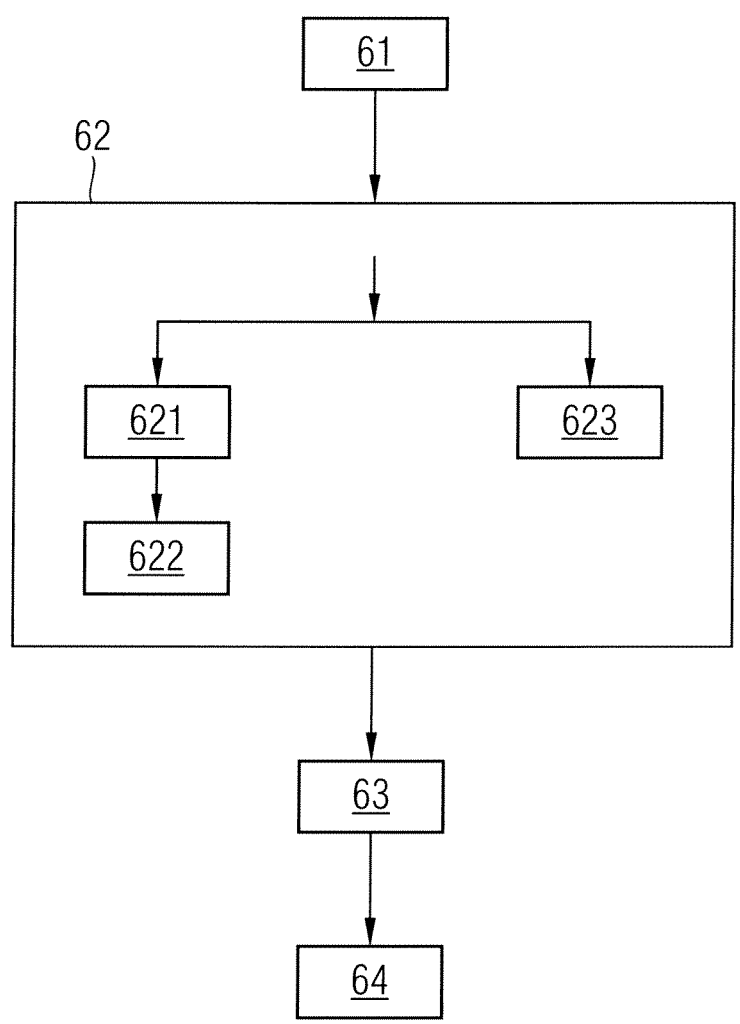

PROCESSING MODULE, A DEVICE, AND A METHOD FOR PROCESSING OF XML DATA

CROSS-REFERENCE TO RELATED APPLICATIONS

This application claims priority to EP Patent Application No. 09002043 filed Feb. 13, 2009, the contents of which is incorporated herein by reference in its entirety.

TECHNICAL FIELD

The present invention refers to a module and a method for processing of XML data by use of a finite state automaton, wherein said XML data is based on a predetermined XML schema and wherein said finite state automaton comprises states and transitions being arranged based on said predetermined XML schema.

BACKGROUND

In many current techniques, applications, systems, arrangements etc. and in several technical areas (industrial systems, communications systems etc.) a data exchange is performed by use of Extensible Markup Language (XML). XML is a general-purpose specification for creating custom mark-up languages. In general, XML allows the users to define mark-up elements and enables sharing of structured data, encoding of documents, and/or serializing of data, for example.

However, besides the possibilities of exploiting XML and besides the broad utilization of XML in several technical areas and in several technical environments, textual XML data have the disadvantage of huge memory requirements, long processing time, and lack of compactness.

Therefore, binary XML formats for enabling a more efficient and a more memory resource saving processing of textual XML data have been introduced. Such binary XML formats are, for example, ISO 23001:1 Binary MPEG format for XML (BiM) or W3C Efficient XML Interchange (EXI).

In particular, binary XML, or Binary Extensible Markup Language, refers to any specification, which defines a compact representation of XML in a binary format. Binary XML formats generally reduce the size of XML documents and, thus, the memory requirements. Furthermore, binary XML formats reduce computing time and computing resources, for example, which arise when parsing and/or processing a XML document or file is performed.

However, with the adoption of several binary XML formats such as BiM or EXI by the market systems and devices with limited resources (e.g., small uControler such as those of the family TI MSP430) are not suitable for providing and supporting several of these binary XML formats, as for each format specific sets of finite state automaton are required, which in turn require additional memory resources.

Thus, when utilizing several binary XML formats, disadvantages with regard to increased memory requirements still exist.

SUMMARY

According to various embodiments, an improved handling and processing of data can be enabled, in particular, of XML data in several systems, applications, and/or devices of several technical areas.

According to an embodiment, a processing module may be configured for processing of XML data by use of a finite state automaton, wherein: the XML data is based on a predetermined XML schema; the finite state automaton comprises states and transitions, the states and transitions being arranged based on the predetermined XML schema; and at least one transition of the transitions, which refers to an element or attribute of the XML schema comprises a variable length binary code, the variable length binary code being arranged to code the element or attribute of the XML schema.

According to a further embodiment, the at least one transition may comprise a fixed length binary code as a further binary code, the fixed length binary code being arranged to code the element or attribute of the XML schema. According to a further embodiment, if the XML data is textual XML data, the processing module can be configured to encode the textual XML data into XML data in a binary XML format, wherein the states and transitions of the finite state automaton are configured to encode the textual XML data into the XML data in the binary XML format by use of the fixed length binary code or by use of the variable length binary code assigned to the at least one code transition of the transitions. According to a further embodiment, if the XML data is XML data in a binary XML format, the processing module can be configured to decode the XML data in the binary XML format into textual XML data, wherein the states and transitions of the finite state automaton are configured to decode the XML data in the binary XML format into the textual XML data by use of the fixed length binary code or by use of the variable length binary code assigned to each of the code transitions. According to a further embodiment, the fixed length binary code may represent a code according to binary XML format W3C EXI. According to a further embodiment, the variable length binary code may represent a code according to binary XML format BiM. According to a further embodiment, the finite state automaton can be generated by: —generating of a first finite state automaton according to the binary XML format EXI by use of the XML schema; —generating of a second finite state automaton according to the binary XML format BiM by use of the XML schema; —identifying of element and attribute transitions of the same elements and attributes in both automatons; concatenating of fixed length codes in the second finite state automaton assigned to code transitions or the second finite state automaton, which lead: —from a start state in the second finite state automaton to a simple state prior to an element or attribute transition in the second finite state automaton, the simple state being a state subsequent to the start state; —from a type state in the second finite state automaton to a further or subsequent simple state prior to an element or attribute transition in the second finite state automaton; —from a type state in the second finite state automaton to an end state in the second finite state automaton, if no further type state is provided between the type state and the end state; or—from a start state in the second finite state automaton to an end state in the second finite state automaton, if no further type state is provided between the start state and the end state; wherein the concatenating of fixed length codes results in variable length codes; —amending of the first finite state automaton by one of the following: adding of each of the variable length codes as an additional binary code to a corresponding code of the first finite state automaton or replacing of each code of the first finite state automaton by a corresponding variable length code from the variable length codes; and—providing of the first finite state automaton as the finite state automaton.

According to another embodiment, a device may comprise a processing module as described above.

According to a further embodiment, the device may comprise a transmitting module, the transmitting module being configured for transmitting of XML data processed by the processing module. According to a further embodiment, the XML data processed by the processing module can be XML data in a binary XML format. According to a further embodiment, the device may comprise a receiving module, the processing module being configured to process XML data received by the receiving module. According to a further embodiment, the XML data received by the receiving module can be XML data in a binary XML format. According to a further embodiment, the device may comprise an automaton generating module, which is configured to generate the finite state automaton by: —generating of a first finite state automaton according to the binary XML format EXI by use of the XML schema; —generating of a second finite state automaton according to the binary XML format BiM by use of the XML schema; —identifying of element and attribute transitions of the same elements and attributes in both automatons; —concatenating of fixed length codes in the second finite state automaton assigned to code transitions or the second finite state automaton, which lead: —from a start state in the second finite state automaton to a simple state prior to an element or attribute transition in the second finite state automaton, the simple state being a state subsequent to the start state; —from a type state in the second finite state automaton to a further or subsequent simple state prior to an element or attribute transition in the second finite state automaton; —from a type state in the second finite state automaton to an end state in the second finite state automaton, if no further type state is provided between the type state and the end state; or—from a start state in the second finite state automaton to an end state in the second finite state automaton, if no further type state is provided between the start state and the end state; wherein the concatenating of fixed length codes results in variable length codes; amending of the first finite state automaton by one of the following: adding of each of the variable length codes as an additional binary code to a corresponding code of the first finite state automaton or replacing of each code of the first state automaton by a corresponding variable length code from the variable length codes; and— providing of the first finite state automaton as the finite state automaton.

According to yet another embodiment, a method for generating of a finite state automaton, the finite state automaton being configured for processing of XML data, wherein the XML data is based on a predetermined XML schema and wherein the finite state automaton comprises states and transitions being arranged based on the predetermined XML schema, may comprise the steps of: —generating of a first finite state automaton according to a binary XML format EXI by use of the XML schema; —generating of a second finite state automaton according to a binary XML format BiM by use of the XML schema; —identifying of element and attribute transitions of the same elements and attributes in both automatons; concatenating of fixed length codes in the second finite state automaton assigned to code transitions or the second finite state automaton, which lead: —from a start state in the second finite state automaton to a simple state prior to an element or attribute transition in the second finite state automaton, the simple state being a state subsequent to the start state; —from a type state in the second finite state automaton to a further or subsequent simple state prior to an element or attribute transition in the second finite state automaton; —from a type state in the second finite state automaton to an end state in the second finite state automaton, if no further type state is provided between the type state and the end state; or—from a start state in the second finite state automaton to an end state in the second finite state automaton, if no further type state is provided between the start state and the end state; wherein the concatenating of fixed length codes results in variable length codes; —amending of the first finite state automaton by one of the following: adding of each of the possible codes as additional binary code to a corresponding code of the first finite state automaton or replacing of each code of the first finite state automaton by a corresponding variable length code from the variable length codes; and— providing of the first finite state automaton as the finite state automaton.

According to yet another embodiment, an automaton generating module can be configured to generate a finite state automaton by: —generating of a first finite state automaton according to the binary XML format EXI by use of the XML schema; —generating of a second finite state automaton according to the binary XML format BiM by use of the XML schema; —identifying of element and attribute transitions of the same elements and attributes in both automatons; concatenating of fixed length codes in the second finite state automaton assigned to code transitions or the second finite state automaton, which lead: —from a start state in the second finite state automaton to a simple state prior to an element or attribute transition in the second finite state automaton, the simple state being a state subsequent to the start state; —from a type state in the second finite state automaton to a further or subsequent simple state prior to an element or attribute transition in the second finite state automaton; —from a type state in the second finite state automaton to an end state in the second finite state automaton, if no further type state is provided between the type state and the end state; or—from a start state in the second finite state automaton to an end state in the second finite state automaton, if no further type state is provided between the start state and the end state; wherein the concatenating of fixed length codes results in variable length codes; —amending of the first finite state automaton by one of the following: adding of each of the variable length codes as an additional binary code to a corresponding code of the first finite state automaton or replacing of each code of the first state automaton by a corresponding variable length code from the variable length codes; and—providing of the first finite state automaton as the finite state automaton.

BRIEF DESCRIPTION OF THE DRAWINGS

The present invention will be more clearly understood from the following description of the preferred embodiments read in conjunction with the attached drawings, in which:

FIG. 3 shows a finite state automaton established according to the known binary XML format BiM, which comprises codes of fixed length and which can be supported by a finite state automaton according to an embodiment;

FIG. 4 shows a finite state automaton established according to a known binary XML format EXI, which comprises codes of fixed length and which can be supported by a finite state automaton according to an embodiment;

FIG. 6 shows a block diagram explaining steps of the method for generating of a finite state automaton according to an embodiment.

DETAILED DESCRIPTION

Figure 1:
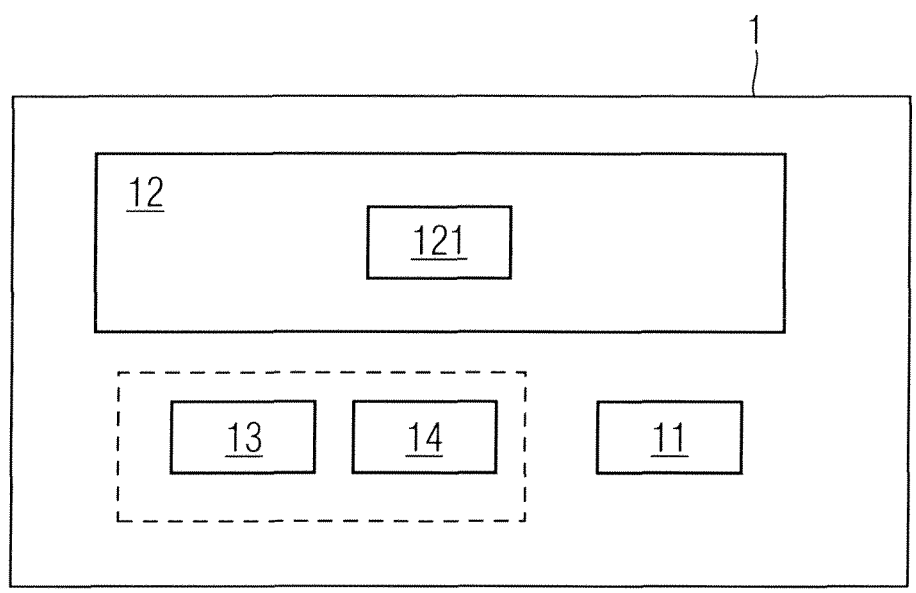
FIG. 1 shows a device comprising a processing module, said device and said processing module being arranged according to an embodiment.

According to various embodiments, a processing module may be configured for processing of XML data by use of a finite state automaton, wherein:
  said XML data is based on a predetermined or predefined XML schema;
  said finite state automaton comprises states and transitions, said states and transitions being arranged based on said predetermined XML schema; and
  at least one (or each) transition of said transitions, which refers to or defines an element or attribute of said XML schema, comprises a variable length binary code, i.e., binary code of a variable length compared to all codes of transitions from a particular state, said variable length binary code being arranged to code an instantiation of said element or attribute of said XML schema.

Thus, the various embodiments allow supporting of several binary XML formats (e.g., BiM or EXI) by use of one finite state automaton for all of the several formats, wherein the finite state automaton is provided with regard to a certain predefined or predetermined XML schema. XML schema such as W3C XML Schema or ISO/IEC 19757-2 Relax NG comprises in general a set of rules, to which an XML document must conform in order to be considered 'valid' according to that schema. In this way, an improved handling and processing of XML data is enabled, wherein, in particular, memory requirements and processing time of components responsible for the handling and processing of the XML data are reduced considerably. Furthermore, also increased flexibility with regard to handling XML data is provided to the corresponding components, as here no binding to a certain predefined binary XML format exists.

According to an embodiment, said at least one (or each) transition of said transitions, which refers to an element or attribute declared in said XML schema, comprises a fixed length binary code, i.e., a binary code of fixed length compared to all codes of transitions from a particular state, as a further code, said fixed length binary code being arranged to code said element or attribute declared in said XML schema.

Further, according to an embodiment, if said XML data is textual XML, said processing module is configured to encode said textual XML into XML data in a binary XML format, wherein said states and transitions of said finite state automaton are configured in general to encode said textual XML into said XML data in said binary XML format by use of said fixed length binary code or by use of said variable length binary code assigned to said at least one (or each) of said transitions, which refers to an element or attribute declared in said XML schema.

In this way, the processing module serves as an encoding module. Thus, for example, the processing module can encode textual XML into binary XML data format for transmission purposes.

Here, it has to be noted, that according to the present invention the term "element and/or attribute declared in said XML schema" has to be understood in the conventional way as defined and used with regard to W3C XML schemas in general.

According to an embodiment, if said XML data is XML data in a binary XML format, said processing module is configured to decode said XML data in said binary XML format into textual XML, wherein said states and transitions of said finite state automaton are configured to decode said XML data in said binary XML format into said textual XML by use of said fixed length binary code or by use of said variable length binary code assigned to each of said transitions.

In this way, the processing module serves as a decoding module. Thus, for example, the processing module can decode received XML data in binary XML data format into textual XML data format for further use of the XML data.

According to an embodiment, said variable length binary code represents a code according to binary XML format BiM. ISO/IEC 23001-1 BiM is currently the most commonly used binary XML format. Originally, it was designed to code the MPEG-7 metadata formats of MPEG. In general, this binary format has opened the opportunity to use XML in systems with limited resources, in particular, in embedded systems, for example. Furthermore, BiM provides a significant compression of textual XML data and thus enables bandwidth saving when transmitting XML data. Moreover, BiM allows also processing of parts of a XML document, not only of a whole XML document. The partial processing of a XML document enables and ensures a further memory resource saving and a further reduction of processing costs like the processing time, for example.

Thus, the various embodiments enable supporting of one of the most used binary XML formats and, further, makes also use of the advantages of the BiM—suitability for systems with limited resources, well compression of textual XML data, memory resource saving, partial processing of textual XML data, and reduction of processing costs.

According to a further embodiment, said fixed length binary code represents a code according to binary XML format W3C EXI.

Currently, EXI represents a new binary format, which improves the compatibility with XML. EXI represents an alternative to BiM and can also be used in devices with limited resources, wherein EXI provides the advantages listed above with regard to BiM and enables additionally a well performance of communication of data in heterogeneous networks or environments where for instance also XML documents, which are not valid to certain XML schemas, are transmitted.

Thus, the various embodiments enable supporting also of future binary XML formats and, further, makes use also of the advantages of the EXI—well communication of data in heterogeneous networks or environments, for example.

According to an embodiment, the number of generated finite state automaton depends on the number of defined complex types of said XML schema:
  number of generated first finite state automaton according to said binary XML format EXI by use of said XML schema is equal to the number of defined complex types of said XML schema
  number of generated second finite state automaton according to said binary XML format BiM by use of said XML schema is equal to the number of defined complex types of said XML schema In the following the states and transitions of said state automaton are classified in further sub categories as those are defined e.g. in ISO/IEC 23001-1 BiM. In the following element transitions declare transitions which when crossed specify which XML element is present in the textual XML data. Similarly, attribute transitions declare transitions which when crossed specify which XML attribute is present in the textual XML data. Code transitions are associated to a binary code. Simple state have no specific behaviour, they are used to structure the automaton. Type states trigger the coding of content of that type e.g. the content of an XML element and are entered by element transitions. Start state and stop state are the start state and stop state of the said finite state automaton derived from a schema definition.

In the following, a code of code transitions is described as variable length code if the length of the binary codes assigned to transitions which start from a particular state varies in length.

According to an embodiment, said finite state automaton is generated by:
- generating of a first finite state automaton according to said binary XML format EXI by use of said XML schema;
- generating of a second finite state automaton according to said binary XML format BiM by use of said XML schema;
- identifying of element and attribute transitions of the same elements and attributes in both automatons;
- concatenating of fixed length codes in said second finite state automaton assigned to code transitions or said second finite state automaton, which lead:
  - from a start state in said second finite state automaton to a simple state prior to an element or attribute transition in said second finite state automaton, said simple state being a state subsequent to said start state;
  - from a type state in said second finite state automaton to a further or subsequent simple state prior to an element or attribute transition in said second finite state automaton;
  - from a type state in said second finite state automaton to an end state in said second finite state automaton, if no further type state is provided between said type state and said end state; or
  - from a start state in said second finite state automaton to an end state in said second finite state automaton, if no further type state is provided between said start state and said end state;
- the concatenating of fixed length codes resulting in variable length codes, i.e. codes of variable length compared to all codes of transitions from a particular state;
- amending of said first finite state automaton by one of the following: adding of each of said variable length codes obtained by said concatenating as an additional binary code to a corresponding code of said first finite state automaton or replacing of each code of said first finite state automaton by a corresponding variable length code from said variable length codes obtained by said concatenating; and
- providing of said first finite state automaton as said finite state automaton also called the generic automaton.

Thus, the various embodiments enable an automatic generating of the finite state automaton, which builds an EXI and BiM codec with the same state automaton, wherein only the knowledge of the XML scheme is required.

An even smaller representation of the finite state automaton, which builds an EXI and BiM codec with the same state automaton, can be achieved by replacing of each code of said first finite state automaton by a corresponding variable length code from said variable length codes obtained by said concatenating as described above and generating the fixed length codes of EXI by:
- counting the transitions of a state to determine the code length of the fixed length code; and
- determining and encoding of the position of the transition to code with the said code length.

According to other embodiments, a computer program product may comprise a code, the code being configured to implement and/or perform activities of the processing module, in particular, the finite state automaton comprised in the processing module.

According to an embodiment, the code is embodied on a data carrier. According to a further embodiment, the computer program product is configured to perform actions of said processing module when the computer program product is executed by a processing unit like a processor, for example.

According to yet another embodiment, a data carrier may comprise said computer program product.

According to yet another embodiment, a device may comprise said processing module.

According to an embodiment, the device comprises a transmitting module, said transmitting module being configured for transmitting of XML data processed by said processing module. Here, said XML data processed by said processing module can be XML data in a binary XML format. Thus, the transmitting module is configured for transmitting XML data encoded into binary XML format by the processing module.

According to a further embodiment, the device comprises a receiving module, said processing module being configured to process XML data received by said receiving module. Here, said XML data received by said receiving module can be XML data in a binary XML format. Thus, the receiving module is configured for receiving XML data encoded into binary XML format by a further processing module, wherein the further processing module corresponds to the processing module sketched above and explained in more detail below.

According to an embodiment, the device comprises an automaton generating module, which is configured to generate said finite state automaton by:
- generating of a first finite state automaton according to said binary XML format EXI by use of said XML schema;
- generating of a second finite state automaton according to said binary XML format BiM by use of said XML schema;
- identifying of element and attribute transitions of the same elements and attributes in both automatons;
- concatenating of fixed length codes in said second finite state automaton assigned to code transitions or said second finite state automaton, which lead:
  - from a start state in said second finite state automaton to a simple state prior to an element or attribute transition in said second finite state automaton, said simple state being a state subsequent to said start state;
  - from a type state in said second finite state automaton to a further or subsequent simple state prior to an element or attribute transition in said second finite state automaton;
  - from a type state in said second finite state automaton to an end state in said second finite state automaton, if no further type state is provided between said type state and said end state; or
  - from a start state in said second finite state automaton to an end state in said second finite state automaton, if no further type state is provided between said start state and said end state;
- the concatenating of fixed length codes resulting in variable length codes, i.e. codes of variable length compared to all codes of transitions from a particular state;
- amending of said first finite state automaton by one of the following: of each of said variable length codes obtained by said concatenating as an additional binary code to a corresponding code of said first finite state automaton or replacing of each code of said first finite state automaton by a corresponding variable length code from said variable length codes obtained by said concatenating; and
- providing of said first finite state automaton as said finite state automaton.

Thus, the various embodiments enable an automatic generating of the finite state automaton, which builds an EXI and BiM codec with the same state automaton, wherein only the knowledge of the XML scheme is required.

An even smaller representation of the finite state automaton, which builds an EXI and BiM codec with the same state automaton, can be achieved by replacing of each code of said first finite state automaton by a corresponding variable length code from said variable length codes obtained by said concatenating as described above and generating the fixed length codes of EXI by counting the transitions of a state to determine the code length of the fixed length code determine and encode the position of the transition to code with the said code length.

Furthermore, according to other embodiments, a system may comprise the processing module. In general, the modules of the system can be arranged similar to the modules of the device introduced above.

Additionally, according to yet other embodiments, a method for generating of a finite state automaton, said finite state automaton being configured for processing of XML data, wherein said XML data is based on a predetermined XML schema and wherein said finite state automaton comprises states and transitions being arranged based on said predetermined XML schema, may comprise the steps of:

generating of a first finite state automaton according to a binary XML format EXI by use of said XML schema;

generating of a second finite state automaton according to a binary XML format BiM by use of said XML schema;

identifying of element and attribute transitions of the same elements and attributes in both automatons;

concatenating of fixed length codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of fixed length codes resulting in variable length codes, i.e. codes of variable length compared to all codes of transitions from a particular state;

amending of said first finite state automaton by one of the following: adding of each of said variable length codes obtained by said concatenating as an additional binary code to a corresponding code of said first finite state automaton or replacing of each code of said first finite state automaton by a corresponding variable length code from said variable length codes obtained by said concatenating; and providing of said first finite state automaton as said finite state automaton.

An even smaller representation of the finite state automaton, which builds an EXI and BiM codec with the same state automaton, can be achieved by replacing of each code of said first finite state automaton by a corresponding variable length code from said variable length codes obtained by said concatenating as described above and generating the fixed length codes of EXI by counting the transitions of a state to determine the code length of the fixed length code determine and encode the position of the transition to code with the said code length.

According to yet another embodiment, a computer program product may comprise a code, the code being configured to implement and/or perform the method for generating of the finite state automaton.

According to an embodiment, the code is embodied on a data carrier. According to a further embodiment, the computer program product is configured to perform said method when the computer program product is executed by a processing unit like a processor, for example.

According to yet another embodiment, a data carrier may comprise said computer program product.

Moreover, according to yet another embodiment, an automaton generating module can be configured to generate a finite state automaton by: —generating of a first finite state automaton according to said binary XML format EXI by use of said XML schema; —generating of a second finite state automaton according to said binary XML format BiM by use of said XML schema; —identifying of element and attribute transitions of the same elements and attributes in both automatons; —concatenating of fixed length codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of fixed length codes resulting in variable length codes, i.e. codes of variable length compared to all transitions from a particular state;

amending of said first finite state automaton by one of the following: adding of each of said variable length codes as an additional binary code to a corresponding code of said first finite state automaton or replacing of each code of said first state automaton by a corresponding variable length code from said variable length codes; and providing of said first finite state automaton as said finite state automaton.

The automaton generating module can be a hardware and/or software module.

Thus, the various embodiments enable an efficient and time and memory saving automaton realization for several binary XML formats like BiM or EXI, for example. In particular, the various embodiments open the opportunity of exploiting several binary formats in devices with limited resources.

An even smaller representation of the finite state automaton, which builds an EXI and BiM codec with the same state automaton, can be achieved by replacing of each code of said first finite state automaton by a corresponding variable length code from said variable length codes obtained by said concatenating as described above and generating the fixed length codes of EXI by:

counting the transitions of a state to determine the code length of the fixed length code; and determining and encoding of the position of the transition to code with the said code length.

In general, the various embodiments enable improved handling and processing of XML data in several systems, applications, and/or devices in several technical areas, wherein, in particular, reduction of processing time and of memory requirements is enabled and increase of flexible and efficient handling of XML data is achieved.

FIG. 1 shows a device 1 comprising a processing module 12, said device 1 and said processing module 12 being arranged according to an embodiment.

The processing module 12 is configured for processing of XML data, which is based on a predefined XML schema. For this purpose, the processing module 12 uses a finite state automaton 121, which comprises states and transitions, both based on the predefined XML schema. Further, the transitions of the finite state automaton 121 are arranged such that they represent two kinds of binary codes: a code of a fixed length compared to all codes of transitions from a particular state and a code of a variable length compared to all codes of transitions from a particular state. The codes are used for coding of elements and attributes declared by the predefined XML schema.

The processing module 12 can perform at least one of the following two functions: encoding of textual XML data into binary XML format and decoding of data provided in a binary XML format into textual XML data.

In the first case, if the processing module 12 acts as an encoder, the states and transitions of the finite state automaton 121 are configured to encode textual XML data by use on the one hand of the codes assigned to code transitions which indicate the presence of elements or attributes and on the other hand of the type encoders or codecs referred to in the type states for element or attribute content encoding of textual XML data.

In the second case, if the processing model 12 acts as a decoder, the states and transitions of the finite state automaton 121 are configured to decode data provided in a binary XML format by use on the one hand of the codes assigned to code transitions which indicate the presence of encoded elements or attributes and on the other hand of the type decoders or codecs referred to in the type states for element or attribute content decoding.

In both cases, either the code of variable length or the code of fixed length will be used. The choice of the code is based on the binary XML format to be used for decoding or encoding. If the binary XML format requires codes with variable length, the codes of variable length assigned to the transitions of the finite state automaton 121 are used. If the binary XML format requires codes with fixed length, the codes of fixed length assigned to the transitions of the finite state automaton 121 are used.

Further, the device 1 comprises a transmitting module 13 for transmitting of data. According to the present embodiment, the transmitting module 13 is configured for transmitting of XML data in binary XML format being encoded by the processing module 12.

Furthermore, the device 1 comprises a receiving module 14 for receiving of data. According to the present embodiment, the receiving module 14 is configured for receiving of XML data in binary XML format being encoded by a further processing module of a further device transmitting the XML data in binary XML format. Here, the further processing module processes the XML data similar to the processing module 12.

Further, the device 1 comprises also an automaton generating module 11, which is configured to generate the finite state automaton 121 as sketched above and described in more detail below, in particular, with regard to FIG. 6.

Figure 2:
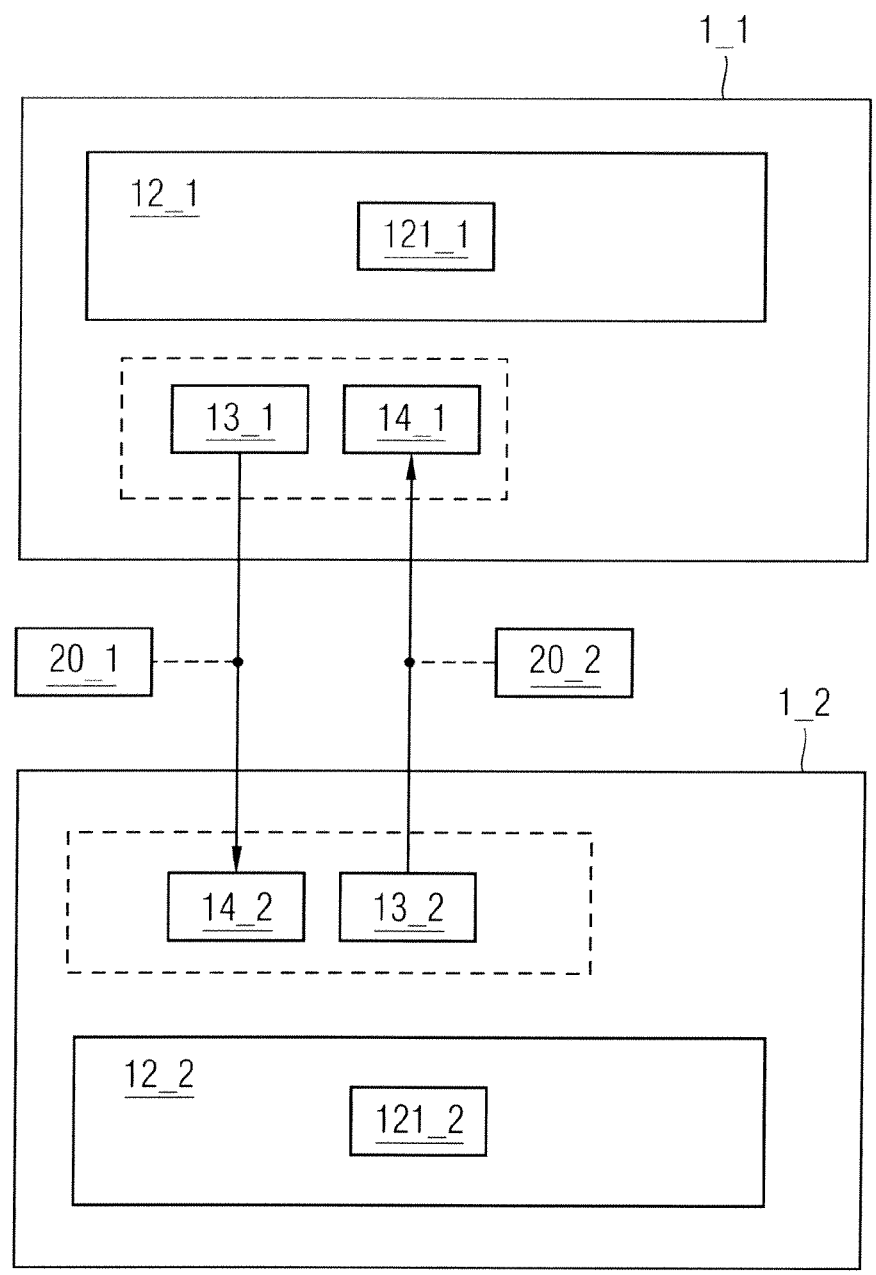
FIG. 2 shows communicating of XML data between two devices arranged according to an embodiment.

FIG. 2 shows a communicating or exchanging of XML data between two devices 1_1, 1_2 arranged according to an embodiment. In particular, the arrangements of the devices 1_1 and 1_2 correspond to the arrangement of the device 1 of FIG. 1.

The first device 1_1 comprises a processing module 12_1 with a finite state automaton 121_1, a transmitting module 13_1, and a receiving module 14_1. The second device 1_2 comprises a processing module 12_2 with a finite state automaton 121_2, a transmitting module 13_2, and a receiving module 14_2.

The transmitting module 13_1 of the first device 1_1 receives XML data in a binary XML format encoded from textual XML data by the processing module 12_1 of the first device 1_1 and transmits this XML data 20_1 in a binary XML format to the second device 1_2. The receiver 14_2 of the second device 1_2 receives this data 20_1 and reaches the data 20_1 to the processing module 12_2 for decoding purposes.

Similarly, the transmitting module 13_2 of the second device 1_2 can get XML data in a binary XML format, said data being encoded by the processing module 12_2 of the second device, and can transmit this data 20_2 to the first device 1_1. The receiving module 14_1 will receive the XML data 20_2 in the binary XML format and pass this data 20_2 to the processing module 12_1 for decoding purposes.

In following, examples of two finite state automatons of known binary XML formats will be provided, which can be supported and implemented by only one finite state automaton arranged in line with principles of the present invention.

For sake of better understanding, the following simple construction of a XML schema formulated in W3C XML Schema will be used exemplary:

```
1    <complexType name="ct">
2      <sequence>
3        <element name="e1" type="int" minOccurs="0"/>
4        <element name="e2" type="int" minOccurs="0"/>
5        <element name="e3" type="int" minOccurs="0"/>
6      </sequence>
7    </complexType name="ct">
```

Here, objects of types "ct" are defined, wherein each of these objects comprises a sequence of the elements "e1", "e2", and "e3", wherein each of the elements "e1", "e2", and "e3" is of type "int", and wherein the provision of the elements "e1", "e2", and "e3" is optional.

FIG. 3 shows a finite state automaton arranged for the above XML schema and established according to the BiM scheme also described in the ISO/IEC 23001-1 specification, which uses codes of fixed length. Here, the states of the automaton are represented by nodes and transitions of the automaton are represented by arrows. In particular, in FIG. 3, the state 30 represents the beginning of an automaton which represents the complex type "ct". After this state 30, a sequence of elements "e1", "e2", and "e3" as characterized above is expected. In the case of the presence of "e1" in the textual XML data a code transition to the simple state 31 is signalled by a code of fixed length "1". The following element transition to type state 32 is signalled by the value of the element "e1". Then a transmission to an simple state 33 is automatically conducted without any signalling. If the sequence provided in the textual XML data does not comprise the element "e1", the code "0" represented by the code transition leading from the start state 30 to the simple state 33 is used.

Then, the state 34 represents or indicates the presence of an element "e2" in the textual XML data. This state 34 is reached by a transition leading from the state 33 to the state 34 and representing the code of fixed length "1". The following transition to state 35 is signalled by the value of the element "e2". Then again a transition to an intermediate state 36 is automatically performed without any signalling. If the sequence provided in the textual XML data does not comprise the element "e2", the code "0" represented by the transition leading from the state 33 to the state 36 is used.

The state 37 represents or indicates the presence of an element "e3" in the textual XML data. This state 37 is reached by a transition leading from the state 36 to the state 37 and representing the code of fixed length "1". The following transition to state 38 is signalled by the value of the element "e3". Then again a transition to the end state 39 is automatically performed without any signalling. If the sequence provided in the textual XML data does not comprise the element "e3", the code "0" represented by the transition leading from the state 36 to the end state 39 is used.

Below, the following textual XML data will be considered exemplary with regard to FIG. 3, FIG. 4, and FIG. 5:

```
<ct>
  <e1>10</e1>
  <e3>30</e3>
</ct>
```

Here, an encoding by use of the finite state automaton of FIG. 3, would provide the following encoded sequence representing the binary XML:

1 encoded-value-of-int(10) 0 1 encoded-value-of-int(30)

Here, the function 'encoded-value-of-int' provides an encoded binary representation of the int value provided to the function as parameter. Thus, encoded-value-of-int(10) returns an encoded binary representation of the int 10, and encoded-value-of-int(30) an encoded binary representation of the int 30.

A decoding of the encoded sequence is performed in a similar way. At first, it is started with state 30 in the finite state automaton, in the encoded sequence the value '1' is read. The value '1' indicates that an element "e1" is decoded. Thus, it is preceded with state 31. Then, the value of the element "e1" is taken from the encoded sequence and decoded. Thus, the finite state automaton is preceded with state 32. The automatic transition to the simple state 33 is performed. Further, the value '0' is read from the encoded sequence, which indicates that no encoding of element "e2" was performed, in the finite state automaton it is proceeded with the simple state 36. Then, the value 1 is read in the binary string, which indicates that an element "e3" has been encoded. Therefore, state 37 in the finite state automaton is reached. Further, the value of the element "e3" is taken from the binary string and decoded. Thus, in the finite state automaton state 38 is reached and the automatic transition to state 39 is performed.

FIG. 4 shows a finite state automaton arranged for the above XML schema and established according to the EXI scheme, which uses codes of fixed length. Also here, the states 40 to 47 of the finite automaton are represented by nodes and transitions of the finite automaton are represented by arrows, wherein element transitions represents elements of the textual XML data declared in XML schema, as provided above. Here, codes of fixed length assigned to transitions referring to elements of an XML schema in accordance with the EXI scheme.

Different to the automaton build based on the BiM scheme the EXI automaton enables to address the first element in the sequence by a direct transition. E.g. if "e3" is the first and only element in the sequence of the textual XML document a single code transition from state 40 to state 45 is performed by signalling "10". In the BiM automaton sketched in FIG. 3 this would require to perform three code transitions from state 30, to state 33, to state 36 and to state 37. Consequently especially the encoding performance of the EXI automaton is higher.

However, the interpretation or reading of states 40 to 47 and transitions of the finite state automaton of FIG. 4 and the encoding and decoding by use of the finite state automaton of FIG. 4 are similar to the interpretation or reading of states and transitions of the finite state automaton of FIG. 3 and to the encoding and decoding by use of the finite state automaton of FIG. 3, as provided above.

When considering the example of textual XML data or document provided above, the encoding of the textual XML data according to the EXI automaton of FIG. 4 provides the following binary string:

00 encoded-value-of-int(10) 01 encoded-value-of-int(30)

Here, it becomes apparent that, if an application supports BiM and EXI for binary XML, it has to provide both automaton data structures. In particular, it means that 18 states (10 states provided by BiM plus 8 states provided by EXI) and 25 transitions (12 transitions provided by BiM plus 13 transitions provided by EXI) have to be present in the system memory. However, applications in environments with limited resources like embedded systems, for example, cannot allocate the required memory. Consequently, they are not suitable or are not capable for supporting and exploiting of both binary formats, the BiM and the EXI.

This problem can be solved according to the present embodiment by use of a "generic" automaton, which is compliant with both binary XML formats, the BiM and the EXI. The construction of such generic automaton according to the present embodiment is performed on the following observation. If code transitions of BiM and EXI as provided in FIG. 3 and FIG. 4 are compared, EXI always connects from the start state and type state to the simple state prior element transition and the end state directly. E.g., the "start" state 40 of the EXI automaton is connected directly to the "simple" state 45 of the "e3" automaton fragment by the "10" code transition. In the BiM automaton, however, the "start" state 30 is connected indirectly to the "simple" state 37 of the "e3" automaton fragment. It means, that two "0" code-transitions and states 33 and 36, and one "1" code transition have to be passed. In the context of an encoding process, EXI would write the bit pattern or code "10" and BiM would write the bit pattern or code "001" into their bit streams to signalize that an "e3" element is encoded.

According to the present embodiment, the generic automaton with direct code transitions is constructed based on the state and transition structure of the EXI automaton. The codes assigned to the transitions of this generic automaton in the BiM case are a concatenation of fixed length codes assigned to code transitions, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state.

The said concatenation of fixed length codes resulting in variable length codes of code transitions of a particular state in the generic automaton in the case of BiM, whereas the codes assigned to the transitions of the generic automaton in the case of EXI are of fixed length.

Figure 5:
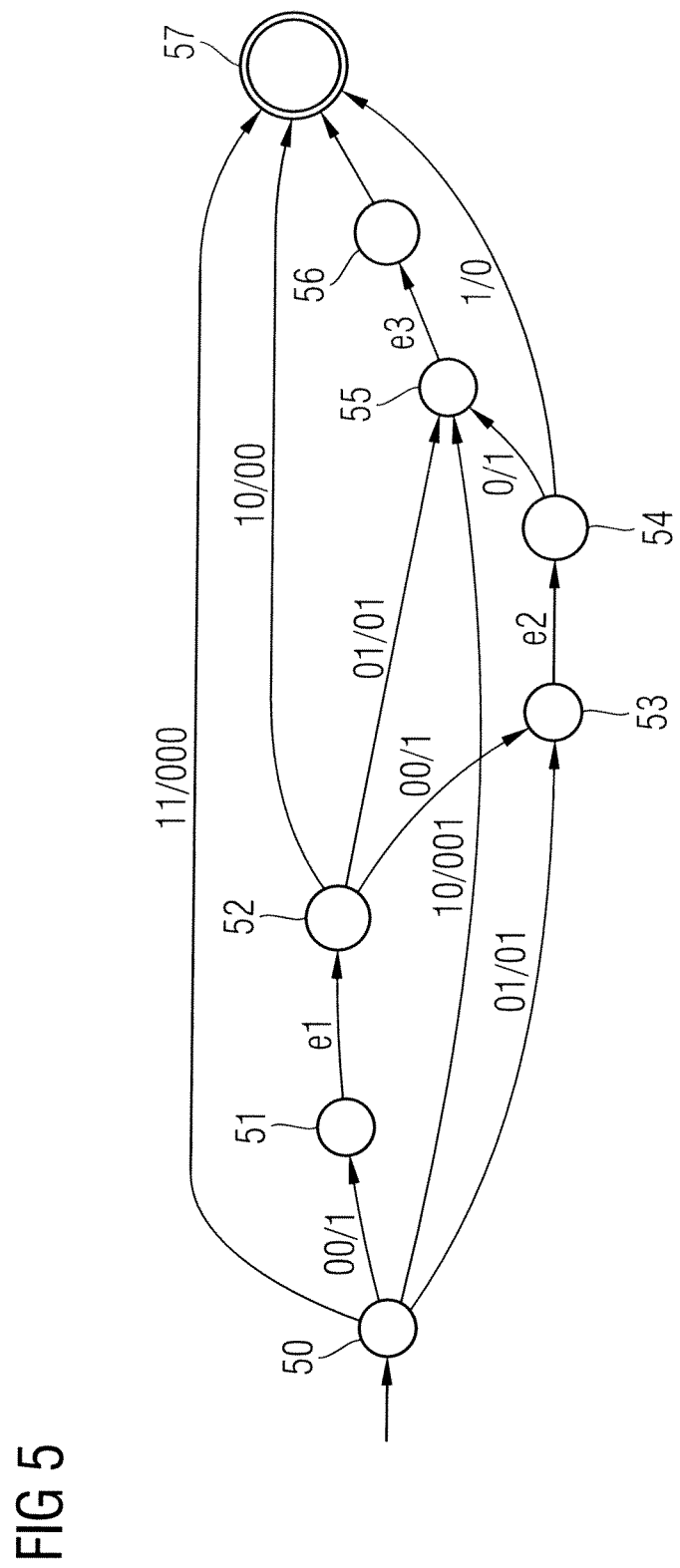
FIG. 5 shows the finite state automaton according to an embodiment.

FIG. 5 shows the generic finite state automaton according to the embodiment with states 50 to 57, wherein each code transition to a simple state prior to an element transition or end state in the generic finite state automaton, comprises two binary codes. The first code represents a binary code or pattern of fixed length as provided by EXI and the second binary code represents a binary code or pattern of variable length as provided by BiM after said concetination.

In following, for sake of clarity, the finite state automaton created and used according to various embodiments and according to the embodiments will be referred to as "generic finite state automaton" or "generic automaton".

Take, for example, the code-transition from "start" state to the "simple" state 55 of the "e3" automaton fragment, which provides the EXI bit pattern or code (before slash) and BiM bit pattern (after slash). When using this automaton provided exemplary in the present embodiment, e.g., for a BiM encoding process, only the BiM bit pattern or code is written into the encoded bit stream. The encoded bit pattern determined by the generic automaton of the present embodiment is identical to the bit pattern, which would be encoded by use of an original BiM automaton as provided in FIG. 3.

The number of states 50 to 57 in the generic automaton of the present embodiment is 8 and the number of transitions in the generic automaton of the present embodiment is 13. Compared to the separated automaton realization of both binary formats the saving factor, achieved by use of various embodiments, for states is 56% and for transitions is 48%. The following table summarizes this aspect:

| BiM | | BiM + EXI | | generic automaton | | Saving Factor | |
|---|---|---|---|---|---|---|---|
| States (S) | Transitions (T) | S | T | S | T | S | T |
| 10 | 12 | 8 | 13 | 18 | 25 | 8 | 13 | 56% | 48% |

Thus, summarizing the generic automaton used according to various embodiments and being compliant with BiM and EXI according to the present embodiment can be characterized as follows:

BiM simple states which are not prior to an element transition are removed so that both automatons (the BiM automaton of FIG. 3 and EXI automaton of FIG. 4) share the same automaton transitions;

the code transitions are labelled differently for BiM and EXI;

the code transitions for BiM are labelled with variable length codes with respect to the code transitions of a particular state the code transitions of EXI are labelled with fixed length codes with respect to the code transitions of a particular state.

The various embodiments provide the advantage that the generic automaton used according to various embodiments uses significantly less number of states and transitions compared to the separated automatons of BiM and EXI. Thus, the generic automaton derived according to an embodiment can be realized in embedded systems with limited resources and can provide both binary formats, BiM and EXI.

FIG. 6 shows a block diagram explaining steps of the method for generating of a finite state automaton according to an embodiment.

At first a XML schema is provided, taken, and analyzed in step 61. Then, an arrangement of at least one or even each complex type of the XML schema is considered and analyzed in step 62.

In particular, within the scope of the step 62, a first finite state automaton according to binary XML format EXI is generated in step 623, and a second finite state automaton according to binary XML format BiM is generated in step 621, wherein said complex type definition or more generally said XML schema is used in the steps 623 and 621.

If the second finite state automaton according to BiM has been generated, possible codes from a start state in said second finite state automaton to each simple state prior to an element transition in said second finite state automaton, from each type state in said second finite state automaton to each simple state prior to an element transition in said second finite state automaton, from each type state in said second finite state automaton to the end state in said second finite state automaton and from the start state in said second finite state automaton to the end state in said second finite state automaton are determined in step 622.

Then, in step 622 such codes are concatenated to variable length codes, which are assigned to transitions, which lead: from a start state in said second finite state automaton to a simple state prior to an element transition in said second finite state automaton, said simple state being a state subsequent to said start state; from a type state in said second finite state automaton to a further or subsequent simple state prior to an element transition in said second finite state automaton; from a type state in said second finite state automaton to an end state in said second finite state automaton, if no further type state is provided between said type state and said end state; or from a start state in said second finite state automaton to an end state in said second finite state automaton, if no further type state is provided between said start state and said end state.

In step 63, the first finite state automaton is amended. Here, two ways of amending are possible according to various embodiments. The first way is performed by adding of each of said possible codes or codes of variable length, concatenated as described above, respectively as an additional binary code to a corresponding code of said first finite state automaton. This way of amending is exemplary presented in FIG. 5. The second way is performed by replacing of each code of said first state automaton by a corresponding variable length code from said variable length codes.

Finally, in step 64, the first finite state automaton is provided as the general finite state automaton according to various embodiments.

Here, it has to be noted, that steps 62 to 64 are performed for each complex type comprised in the XML scheme.

Thus, for each complex type comprised in the XML scheme a generic finite state automaton is provided.

In this way, various embodiments enable automatic providing of generic automatons for arbitrary XML schemas.

Thus, the various embodiments refer to processing of XML data by use of a finite state automaton, wherein said XML data is based on a predetermined XML schema and wherein said finite state automaton comprises states and transitions, said states and transitions being arranged based on said predetermined XML schema. Further, the finite state automaton is arranged or generated such that each of the code transitions of the finite state automaton, which refers to an element or attribute of said XML schema, comprises a variable length binary code, said variable length binary code being arranged to code said element or attribute of said XML schema. The various embodiments provide an improved handling of XML data in several systems or devices of several technical areas, where data needed for operating of the systems or devices or processed by the systems or devices are based on XML. Further, the various embodiments allow saving of memory resources and processing resources or costs in said systems and devices.

As stated above, the EXI automaton can be efficiently implemented especially for the encoder as the XML elements and attributes to be encoded are addressed directly. The BiM codec can be efficiently implemented by generating the structure of the generic automaton and only assigning the variable length codes of the BiM codec to the transitions. This leads especially to a runtime efficient implementation of the BiM encoder.

On the other hand this leads to another facet of the present invention. A generic codec which is capable of coding BiM and/or EXI can be implemented efficiently by assigning also the fixed length EXI codes to the code transistions in addition to the variable length BiM codes. Depending on the mode the codec is working in, BiM and/or EXI, the appropriate codes are selected by the codec when passing the codec transition.

While embodiments and applications of the invention have been shown and described above, it should be apparent to those skilled in the art, that many more modifications (than mentioned above) are possible without departing from the inventive concept described herein. The invention, therefore, is not restricted except in the spirit of the appending claims. Therefore, it is intended that the foregoing detailed description should be regarded as illustrative rather than limiting.

What is claimed is:

1. A processing module, embodied as one or more computer program products stored in non-transitory machine-readable media, said processing module being configured for processing of extensible markup language (XML) data by use of a finite state automaton, wherein:
   said XML data is based on a predetermined XML schema;
   said finite state automaton comprises states and transitions, said states and transitions being arranged based on said predetermined XML schema;
   at least one transition of said transitions, which refers to an element or attribute of said XML schema comprises a variable length binary code, said variable length binary code being arranged to code said element or attribute of said XML schema;
   at least one transition comprises a fixed length binary code as a further binary code, said fixed length binary code being arranged to code said element or attribute of said XML schema; and
   wherein said fixed length binary code represents a code according to a first binary XML format;
   wherein said variable length binary code represents a code according to a second binary XML format and wherein said finite state automaton is generated by:
      generating a first finite state automaton according to said first binary XML format by use of said XML schema;
      generating a second finite state automaton according to said second binary XML format by use of said XML schema;
      identifying element and attribute transitions of same elements and attributes in both the first finite state automaton and the second finite state automaton; and
      concatenating the fixed length binary codes in said second finite state automaton assigned to code transitions or said second finite state automaton;
      wherein the variable length binary code results from a concatenation of the fixed length binary codes.

2. The processing module according to claim 1, wherein, if said XML data is textual XML data, said processing module is configured to encode said textual XML data into XML data in a binary XML format, wherein said states and transitions of said finite state automaton are configured to encode said textual XML data into said XML data in said binary XML format by use of said fixed length binary code or by use of said variable length binary code assigned to said at least one code transition of said transitions.

3. The processing module according to claim 1, wherein, if said XML data is XML data in a binary XML format, said processing module is configured to decode said XML data in said binary XML format into textual XML data, wherein said states and transitions of said finite state automaton are configured to decode said XML data in said binary XML format into said textual XML data by use of said fixed length binary code or by use of said variable length binary code assigned to each of said code transitions.

4. The processing module according to claim 1, wherein said fixed length binary code represents a code according to binary XML format World Wide Web Consortium (W3C) Efficient XML Interchange (EXI).

5. The processing module according to claim 1, wherein said variable length binary code represents a code according to binary XML format Binary MPEG Format (BiM).

6. A processing module, embodied as one or more computer program products stored in non-transitory machine-readable media, said processing module being configured for processing of extensible markup language (XML) data by use of a finite state automaton, wherein:
   said XML data is based on a predetermined XML schema;
   said finite state automaton comprises states and transitions, said states and transitions being arranged based on said predetermined XML schema;
   at least one transition of said transitions, which refers to an element or attribute of said XML schema comprises a variable length binary code, said variable length binary code being arranged to code said element or attribute of said XML schema;
   wherein said at least one transition comprises a fixed length binary code as a further binary code, said fixed length binary code being arranged to code said element or attribute of said XML schema;
   wherein said fixed length binary code represents a code according to binary XML format World Wide Web Consortium (W3C) Efficient XML Interchange (EXI);
   wherein said variable length binary code represents a code according to binary XML format Binary MPEG Format (BiM) and wherein said finite state automaton is generated by:

generating of a first finite state automaton according to said binary XML format EXI by use of said XML schema;

generating of a second finite state automaton according to said binary XML format BiM by use of said XML schema;

identifying of element and attribute transitions of same elements and attributes in both the first finite state automaton and the second finite state automaton;

concatenating of the fixed length binary codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of the fixed length binary codes resulting in the variable length binary codes;

amending of said first finite state automaton by one of the following: adding of each of said variable length binary codes as an additional binary code to a corresponding code of said first finite state automaton or replacing of each code of said first finite state automaton by a corresponding variable length binary code from said variable length binary codes; and providing of said first finite state automaton as said finite state automaton.

7. A device, comprising a processing module embodied as one or more computer program products stored in non-transitory machine-readable media, said processing module being configured for processing of extensible markup language (XML) data by use of a finite state automaton, wherein:

said XML data is based on a predetermined XML schema;

said finite state automaton comprises states and transitions, said states and transitions being arranged based on said predetermined XML schema;

at least one transition of said transitions, which refers to an element or attribute of said XML schema comprises a variable length binary code, said variable length binary code being arranged to code said element or attribute of said XML schema;

at least one transition comprises a fixed length binary code as a further binary code, said fixed length binary code being arranged to code said element or attribute of said XML schema;

wherein said fixed length binary code represents a code according to a first binary XML format;

wherein said variable length binary code represents a code according to a second binary XML format and wherein said finite state automaton is generated by:

generating a first finite state automaton according to said first binary XML format by use of said XML schema;

generating a second finite state automaton according to said second binary XML format by use of said XML schema;

identifying element and attribute transitions of same elements and attributes in both the first finite state automaton and the second finite state automaton;

concatenating the fixed length binary codes in said second finite state automaton assigned to code transitions or said second finite state automaton; and wherein the variable length binary code results from a concatenation of the fixed length binary codes.

8. The device according to claim 7, said device comprising a transmitting module, said transmitting module being operable to transmit XML data processed by said processing module.

9. The device according to claim 8, wherein said XML data processed by said processing module is XML data in a binary XML format.

10. The device according to claim 7, said device comprising a receiving module, said processing module being configured to process XML data received by said receiving module.

11. The device according to claim 10, wherein said XML data received by said receiving module is XML data in a binary XML format.

12. A device, comprising a processing module embodied as one or more computer program products stored in non-transitory machine-readable media, said processing module being configured for processing of extensible markup language (XML) data by use of a finite state automaton, wherein:

said XML data is based on a predetermined XML schema;

said finite state automaton comprises states and transitions, said states and transitions being arranged based on said predetermined XML schema;

at least one transition of said transitions, which refers to an element or attribute of said XML schema comprises a variable length binary code, said variable length binary code being arranged to code said element or attribute of said XML schema;

wherein said device comprises an automaton generating module, embodied as one or more computer program products stored in non-transitory machine-readable media, which is configured to generate said finite state automaton by:

generating of a first finite state automaton according to said binary XML format Efficient XML Interchange (EXI) by use of said XML schema;

generating of a second finite state automaton according to binary XML format Binary MPEG Format (BiM) by use of said XML schema;

identifying of element and attribute transitions of same elements and attributes in both the first finite state automaton and the second finite state automaton;

concatenating of fixed length binary codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of the fixed length binary codes resulting in the variable length binary codes;

amending of said first finite state automaton by one of the following: adding of each of said variable length binary codes as an additional binary code to a corresponding code of said first finite state automaton or replacing of each code of said first state automaton by a corresponding variable length binary code from said variable length binary codes; and providing of said first finite state automaton as said finite state automaton.

13. A method for generating of a finite state, automaton, embodied as one or more computer program products stored in non-transitory machine-readable media, said finite state automaton being configured for processing of extensible markup language (XML) data, wherein said XML data is based on a pre-determined XML schema and wherein said finite state automaton comprises states and transitions being arranged based on said predetermined XML schema, said method comprising the steps of:

generating of a first finite state automaton according to a binary XML format Efficient XML Interchange (EXI) by use of said XML schema;

generating of a second finite state automaton according to a binary XML format Binary MPEG Format (BiM) by use of said XML schema;

identifying of element and attribute transitions of same elements and attributes in both the first finite state automaton and the second finite state automaton;

concatenating of fixed length codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of the fixed length codes resulting in the variable length codes;

amending of said first finite state automaton by one of the following: adding of each of said variable length codes as additional binary code to a corresponding code of said first finite state automaton or replacing of each code of said first finite state automaton by a corresponding variable length code from said variable length codes; and providing of said first finite state automaton as said finite state automaton.

14. An automaton generating module, embodied in one or more computer program products stored in non-transitory machine-readable media, which is configured to generate a finite state automaton by:

generating of a first finite state automaton according to a binary extensible markup language (XML) format Efficient XML Interchange (EXI) by use of an XML schema;

generating of a second finite state automaton according to said binary XML format Binary MPEG Format (BiM) by use of said XML schema;

identifying of element and attribute transitions of same elements and attributes in both the first finite state automaton and the second finite state automaton;

concatenating of fixed length codes in said second finite state automaton assigned to code transitions or said second finite state automaton, which lead:

from a start state in said second finite state automaton to a simple state prior to an element or attribute transition in said second finite state automaton, said simple state being a state subsequent to said start state;

from a type state in said second finite state automaton to a further or subsequent simple state prior to an element or attribute transition in said second finite state automaton;

from a type state in said second finite state automaton to an end state in said second finite state automaton, if no further type state is provided between said type state and said end state; or from a start state in said second finite state automaton to an end state in said second finite state automaton, if no further type state is provided between said start state and said end state;

the concatenating of the fixed length codes resulting in variable length codes;

amending of said first finite state automaton by one of the following: adding of each of said variable length codes as an additional binary code to a corresponding code of said first finite state automaton or replacing of each code of said first state automaton by a corresponding variable length code from said variable length codes; and providing of said first finite state automaton as said finite state automaton.

\* \* \* \* \*